United States Patent
Rudloff (10) Patent No.: US 9,251,516 B2
(45) Date of Patent: Feb. 2, 2016

(54) SYSTEMS AND METHODS FOR ELECTRONIC DISTRIBUTION OF JOB LISTINGS

(75) Inventor: Alexander C. Rudloff, Satellite Beach, FL (US)

(73) Assignee: AOL Inc., Dulles, VA (US)

( * ) Notice: Subject to any disclaimer, the term of this patent is extended or adjusted under 35 U.S.C. 154(b) by 1094 days.

(21) Appl. No.: 12/912,644

(22) Filed: Oct. 26, 2010

(65) Prior Publication Data
US 2011/0099118 A1    Apr. 28, 2011

Related U.S. Application Data

(60) Provisional application No. 61/254,987, filed on Oct. 26, 2009.

(51) Int. Cl.
*G06Q 10/10* (2012.01)
*G06Q 30/00* (2012.01)
*G06Q 30/06* (2012.01)
*G06Q 10/00* (2012.01)

(52) U.S. Cl.
CPC .............. *G06Q 30/00* (2013.01); *G06Q 10/00* (2013.01); *G06Q 10/1053* (2013.01); *G06Q 30/0625* (2013.01)

(58) Field of Classification Search
CPC   G06Q 10/10; G06Q 10/1053; G06Q 30/0625
USPC ......................................... 705/321, 10; 707/5
See application file for complete search history.

(56) References Cited

U.S. PATENT DOCUMENTS

| | | | |
|---|---|---|---|
| 7,080,073 B1* | 7/2006 | Jiang et al. | |
| 8,086,624 B1* | 12/2011 | Hubinette | 707/769 |
| 8,260,777 B1* | 9/2012 | Manber | 707/731 |
| 8,719,101 B1* | 5/2014 | Booth et al. | 705/14.73 |
| 2006/0229896 A1* | 10/2006 | Rosen et al. | 705/1 |
| 2006/0265266 A1* | 11/2006 | Chen et al. | 705/9 |
| 2009/0006213 A1* | 1/2009 | Lerman et al. | 705/14 |
| 2009/0063468 A1* | 3/2009 | Berg | 707/5 |
| 2009/0063491 A1* | 3/2009 | Barclay et al. | 707/9 |
| 2009/0106105 A1* | 4/2009 | Lewis et al. | 705/14 |
| 2010/0280904 A1* | 11/2010 | Ahuja | 705/14.58 |
| 2011/0010224 A1* | 1/2011 | Gupta et al. | 705/10 |

* cited by examiner

*Primary Examiner* — Mark A Fleischer
(74) *Attorney, Agent, or Firm* — Finnegan, Henderson, Farabow, Garrett & Dunner, LLP (57) ABSTRACT

Systems and methods are provided for electronically distributing job listings. In one implementation, a method is provided that includes receiving information for job listings from one or more employers, and associating one or more keyword tags with each job listing. The method also includes identifying a content web page for injecting at least one job listing; analyzing text of the identified content web page; and selecting a job listing for injection into the content web page, based on a comparison between the analyzed text and the one or more keyword tags.

20 Claims, 7 Drawing Sheets

FIG. 1

Engadget ▼  Autoblog ▼  Tech ▼  Finance ▼  Joystiq ▼

Web  Images  Video  News  Local

The Unofficial Apple Weblog                    ( Search )

iPhone  Apple News  Mac 101  Request App Review          Photos ↓🔊 RSS Feeds  Send us Tips <Back to Job Board
iPhone Application Developer

| Company: Yellowbook | Salary: $100k/annually | ( Apply Online ) |
| Location: Orlando, FL | Job Type: Full-time | |
| Date: May 16, 2009 | Options: Telecommute | |

Job Description

The Social Marketer will develop and incorporate social sharing initiatives that drive traffic to both Yellowbook.com and newly developed vertical websites. This candidate will be responsible for increasing the 'share-ability' of Yellowbook data and content to facilitate peer-to-peer referral traffic and establish repeat usage in the social network communities. This position requires the candidate to consistently seek out and engage potential customer segments to introduce Yellowbook's ease of data sharing.

Primary Responsibilities:
- Develop and execute social media marketing strategies for Yellowbook.com
- Utilize blog posts to engage user base and develop legitimate inbound links
- Promote social bookmarking with DIGG, del.icio.us, stumbleupon etc.
- Develop microblogging strategy (Twitter, TinyURLs) to facilitate content sharing
- Locate and engage with social media marketing groups
- Leverage social networks to increase Yellowbook.com content distribution
- Introduce strategy social sharing of business related multimedia – video/pictures
- Coordinate multi-channel campaigns with other internal marketing departments
- Coordinate 3rd party content creation for targeted website features Secondary Responsibilities:
- Maintain latest awareness of Social Marketing trends and developments
- Develop scalable natural link building strategy.

Qualifications:
4 year college degree required with the following:
- 3 years experience in: marketing, communications, PR, journalism or related field
- Professional corporate or professional blogging experience
- A passion for social media marketing and other inbound marketing strategies
- Strong professional social skills including public speaking and presenting
- Experience with social skills including public speaking and presenting
- Familiarity with WordPress or other common blog tools
- Skilled at developing web site and/or press release content -Originally posted on Engadet.com Apply Online

| Apply with your Emurse URL: [?] | OR | Upload Resume: |
| [________].emurse.com | | ( Choose File ) no file selected |

( Apply Now )

FIG. 2

|  |  | Engadget ▼ Autoblog ▼ Tech ▼ Finance ▼ Joystiq ▼ |
|---|---|---|

The Unofficial Apple Weblog — Web  Images  Video  News  Local — Search iPhone  Apple News  Mac 101  Request App Review — Photos  RSS Feeds  Send us Tips

Job Board — Only $350 for 30 days — Post a Job

| Filter Jobs: | Date ▽ | Job Title | Company | Location |
|---|---|---|---|---|
| By Category | May 16 | iPhone Developer | Yellowbook | Orlando, FL |
| Blogging (2) | | The iPhone Developer will develop and incorporate social sharing initiatives that drive traffic to both Yellowbook.com ... more | | |
| Consulting (1) | May 16 | iPhone Application Developer | Hudson Technical | Orlando, FL |
| Design (4) | | The iPhone Developer will develop and incorporate social sharing initiatives that drive traffic to both Yellowbook.com ... more | | |
| Development (10) | | | | |
| Executive (0) | May 16 | iPhone Application Developer | Yellowbook | Orlando, FL |
| more ▽ | | The iPhone Developer will develop and incorporate social sharing initiatives that drive traffic to both Yellowbook.com ... more | | |
| By Location | May 16 | iPhone Application Developer | Hudson Technical | Orlando, FL |
| Atlanta (2) | | The iPhone Developer will develop and incorporate social sharing initiatives that drive traffic to both Yellowbook.com ... more | | |
| Boston (1) | | | | |
| Chicago (4) | May 16 | iPhone Application Developer | Yellowbook | Orlando, FL |
| Los Angeles (8) | | The iPhone Developer will develop and incorporate social sharing initiatives that drive traffic to both Yellowbook.com ... more | | |
| New York (10) | | | | |
| more ▽ | May 16 | iPhone Application Developer | Hudson Technical | Orlando, FL |
| | | The iPhone Developer will develop and incorporate social sharing initiatives that drive traffic to both Yellowbook.com ... more | | |
| By Job Type | May 16 | iPhone Application Developer | Yellowbook | Orlando, FL |
| Full-time (2) | | The iPhone Developer will develop and incorporate social sharing initiatives that drive traffic to both Yellowbook.com ... more | | |
| Part-time (1) | | | | |
| Contract (4) | May 16 | iPhone Application Developer | Hudson Technical | Orlando, FL |
| Permanent (10) | | The iPhone Developer will develop and incorporate social sharing initiatives that drive traffic to both Yellowbook.com ... more | | |
| Temporary (0) | | | | |
| more ▽ | May 16 | iPhone Application Developer | Yellowbook | Orlando, FL |
| | | The iPhone Developer will develop and incorporate social sharing initiatives that drive traffic to both Yellowbook.com ... more | | |
| By Details | May 16 | iPhone Application Developer | Hudson Technical | Orlando, FL |
| Telecommute (1) | | The iPhone Developer will develop and incorporate social sharing initiatives that drive traffic to both Yellowbook.com ... more | | |
| Salary Listed (6) | | | | |
| Simple Apply (3) | | | | |
| By Job Board | | | | |
| AutoBlog (1) | | | | |
| Download Squad (1) | | | | |
| Engadget (3) | | | | |
| Joystiq (2) | | Jobs from our Partner | | careerbuilder.com |
| more ▽ | May 12 | iPhone Developer | Yellowbook | Orlando, FL |
| | | The iPhone Developer will develop and incorporate social sharing initiatives that drive traffic to both Yellowbook.com ... more | | |

SYSTEMS AND METHODS FOR ELECTRONIC DISTRIBUTION OF JOB LISTINGS

RELATED APPLICATION(S)

This application claims the benefit of priority of U.S. Provisional Patent Application No. 61/254,987, filed Oct. 26, 2009, which is incorporated by reference herein in its entirety.

BACKGROUND

The present disclosure generally relates to electronic distribution systems and methods for employment data. More particularly and without limitation, the present disclosure relates to systems and methods for the electronic distribution of job listings, such as over the Internet.

BACKGROUND INFORMATION

Traditionally, employers have listed job openings in the classified sections of newspapers or other printed circulations. Employers would create a job listing for each opening, including a job title, a short description of the position, and contact information. Job seekers would scan the classified sections looking for suitable positions based on the description of the position. This method of advertising and seeking employment via printed circulation is inefficient and ineffective. In particular, job listings are usually limited to those within the geographic circulation of the newspaper. Moreover, the audience of job seekers is limited to those individuals who happened to obtain the newspaper containing the job listing.

Recently, through the advent and growth of the Internet, job listings are now provided on various web sites. For example, employers now create electronic job listings, including a job title, short description of the position, and contact information, which are posted on one or more web sites. Job seekers can now access web sites on which these job listings are displayed, and keyword search the job listings based on location, description of the position, and other employer-defined categories of the job.

Although known Internet-based techniques for providing job listings are an improvement over printed circulations and similar media, these approaches remain relatively inefficient and ineffective. For example, each job listing is still only displayed to those job seekers who search for the combination of criteria matching the particular job listing. Moreover, the vast diversity of industries, locations, job seekers, and employers on the Internet make it desirable to more precisely target suitable job openings with ideal candidates, beyond merely returning job listings based on search criteria.

Moreover, as the field of employment services has moved towards Internet-based advertising, networking, and searching, the market for online recruiting has become increasingly fragmented. As a result, there is a growing number of aggregators of job listings and job seekers across various web sites on the Internet. Because such aggregation tools are not necessarily more effective, there is an increased need to better target active job seekers, and to draw in so-called "passive job seekers" (i.e., those who may be employed, but mildly interested in a new job). Thus, it may be desirable to recommend particular job listings to numerous people visiting web sites across the Internet, even if those people are not actively searching for a job listing at that moment.

Accordingly, the present disclosure describes improved systems and methods for solving one or more of the problems described above. Moreover, consistent with the present disclosure, systems and methods are disclosed for electronically distributing job listings, for example, over the Internet. Implementations of the techniques described may include a method or process, an apparatus or system, and/or computer software on a computer-accessible medium. The details of one or more implementations are set forth below. Other features will be apparent from the description and drawings of the present disclosure.

SUMMARY

In accordance with one disclosed exemplary embodiment, a method for electronically distributing job listings on the Internet is disclosed. The method includes: receiving information for job listings from one or more employers; associating one or more keyword tags with each job listing; identifying a content web page for injecting at least one job listing; analyzing text of the identified content web page; and selecting a job listing for injection into the content web page, based on a comparison between the analyzed text and the one or more keyword tags.

In accordance with another disclosed exemplary embodiment, a system for electronically distributing job listings on the Internet is disclosed. The system includes: a memory device storing instructions for using a processor to electronically distribute job listings over the Internet; and a processor configured for: receiving job listing information from one or more employers; associating one or more keyword tags with the job listing information; identifying a content web page for which an injected job listing is desired; analyzing text of the identified content web page; and selecting a job listing for injection into the content web page, based a comparison between the analyzed text and the one or more keyword tags.

In accordance with another disclosed exemplary embodiment, a method for electronically distributing job listings on the Internet is disclosed. The method includes: receiving information on job listings from one or more employers; receiving resume information of users applying for job listings; identifying resume keyword tags based on the resume information; associating the resume keyword tags with the information for the job listings; receiving a characteristic associated with a user visit to a content web page; analyzing text of the content web page; and selecting a job listing for injection into the content web page, based on the resume keyword tags, the analyzed text, and the characteristic of the user visit.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

DESCRIPTION OF DRAWINGS

The following figures are used to describe exemplary features and embodiments related to the present disclosure. In the figures:

FIG. 2 is a screenshot of an exemplary electronic job listing displayed on a web page of the Internet, consistent with embodiments of the present disclosure;

FIG. 3 is a screenshot of an exemplary job board, or listing of electronic job openings displayed on a web page of the Internet, consistent with embodiments of the present disclosure;

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographic region.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
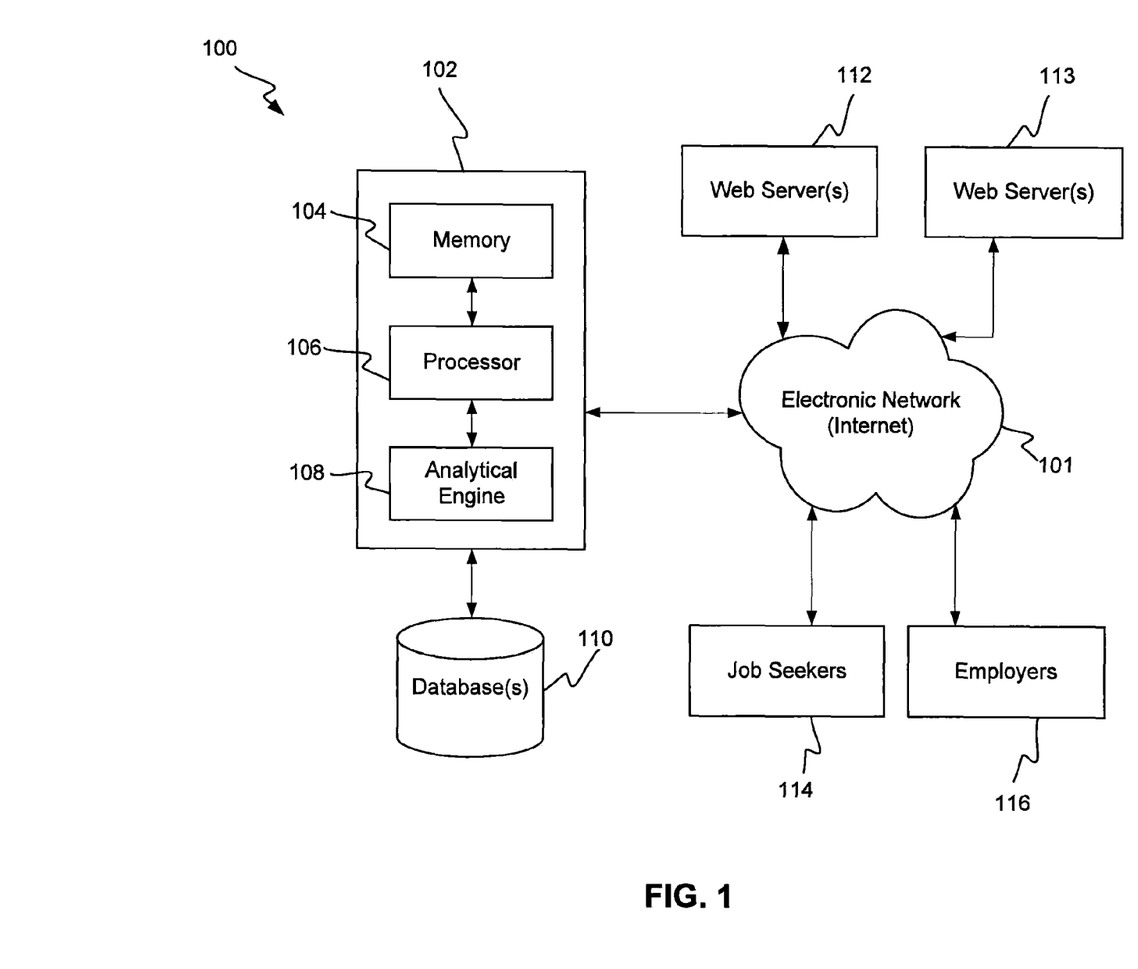
FIG. 1 is a block diagram of an exemplary system environment for electronically distributing job listings over the Internet, in accordance with embodiments of the present disclosure.

FIG. 1 depicts a block diagram of an exemplary system environment 100 for electronically distributing job listings over the Internet, consistent with the exemplary methods described herein. In one embodiment, system environment 100 may include a distribution system 102, a database 110, and a plurality of web servers 112 disposed in communication with an electronic network 101, such as the Internet and/or other suitable communications networks or combinations of networks. The above-mentioned components may function together to provide an online job listing network. Such a network may also include or interact with a plurality of web servers 113, a plurality of job seekers 114, and a plurality of employers 116 that are also disposed in communication with electronic network 101. In certain embodiments, the web servers may be organized as in-network web servers 112 and out-of-network web servers 113.

Web servers 112 and 113 each may comprise one or more servers or server farms that host or operate a wide variety of content sites, such as news sites, product review sites, e-commerce sites, company/organization sites, opinion sites, social networking sites, or a user generated content (UGC) sites, such as a weblog or "blog." Such content sites may be accessible to the public, or may be implemented as internal or private sites.

Employers 116 may submit job listing information and keyword tags to distribution system 102 over network 101. Any suitable file format may be utilized for electronically submitting the job listing, including rtf, pdf, html, or bd. In certain embodiment, employers 116 may submit job listing information by accessing a portal or web site of distribution system 102, and completing one or more forms and posting the job listing data.

Each electronic job listing may include a title, a listing company (i.e., the employer), location, listing date, salary, job type, industry category, job description, qualifications, responsibilities, and/or information for contacting the employer, applying for the position, and/or uploading a resume. Employers 116 may submit keyword tags they deem to be relevant to the job description of the listed job.

Job seekers 114 may submit resume files, resume information, job search criteria, personal information, and/or demographic information to distribution system 102 via network 101. In certain embodiments, job seekers 114 may access a portal or web site associated with the online job listing network and submit log-in data and the above identified information via network 101. Job seekers 114 may be any person or entity with access to network 101, but not necessarily an existing relationship with the online job listing network.

The terms "job seeker" and "user" as used in this description may refer to, for example, any consumer, viewer, or visitor of a web page or website, and can also refer to the aggregation of individual users into certain groupings. References to users "viewing" content and/or job listings is meant to include any presentation, whether visual, aural, tactile, or a combination thereof. In certain embodiments, users may be a subset of Internet users defined by their membership in a network associated with the online job listing network. For example, users may be provided with a username and password by which they may log-in to a network website. The network may retain a set of attributes associated with each user, in a searchable profile. The attributes may reflect the user's interests and incorporate characteristics that impact content and job listings selection, purchasing, and other online behavior. Attributes may be created based on user data, such as impression history, click history, purchase history, demographic data, submission history, preferences, etc., any of which may be user-supplied.

In one embodiment, distribution system 102 may include any suitable combination of hardware, software, and/or firmware, including a memory 104, a processor 106, an analytical engine 108, which are configured to analyze the job listing information and tag information provided by employers 116, as well as the resume and job search criteria provided by job seekers 114. Memory 104 may also store instructions which, when executed by processor 106, cause the display of one or more user interfaces. Furthermore, distribution system 102 may be configured to analyze blog and other content sites hosted on both in-network web servers 112 and out-of-network web servers 113, in accordance with the embodiments described herein. For example, distribution system 102 may be configured to analyze aggregated data from each job listing, each content site, and the substance of resumes submitted for each job listing in order to further modify a relevance factor and improve the targeted distribution of job listings to appropriate content sites.

Distribution system 102 may be configured to store job listing information, blog/content site information, job seeker information, resume information, relevancy rankings, etc. in database 110. Distribution system 102 may also store instructions in memory 104 and/or database 110 for performing various processes and tasks related to job listings distribution. Moreover, distribution system 102 may be adapted to access database 110 to select and distribute job listings in a targeted manner.

Memory 104 may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. Processor 106 may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

Database 110 may be any suitable type of large scale data storage device, which may optionally include any type or combination of slave databases, load balancers, dummy servers, firewalls, back-up databases, and/or any other desired database components. In one embodiment, database 110, may be implemented as Solr/Tomcat databases, and/or any other enterprise search servers. For example, database 110 may include a contextual index, such as a Lucene/Solr distributed index, Sphinx distributed index, or Lemur/Indri distributed index. These components may be used for indexing of text content. Although not necessary, for performance reasons, it may be desired that the size of individual index shards is such that each shard can be stored in main memory on its node. Database 110 may also be distributed MySQL servers (e.g., servers on multiple nodes used for partitioning or replication purposes). In one exemplary embodiment, the database 110 may be single-node MySQL servers used to store medium-sized data sets for analysis, reporting/presentation, and other purposes. The data stored in such a server may be used to build an interface directed towards APIs of content sites, employers, and/or other online employment entities.

FIG. 2 depicts a screenshot of an exemplary electronic job listing that may be displayed, for example, on a web page of the Internet. In particular, the electronic job listing may include a title, a listing company (i.e., the employer), location, listing date, salary, job type, industry category, job description, qualifications, responsibilities, and/or information for contacting the employer, applying for the position, and/or uploading a resume. In certain embodiments, the electronic job listing may include a user element, such as a button, that a job seeker may manipulate to contact the employer and/or upload a resume. Employers may be able to post such an electronic job listing to a web site administered or hosted by an online job listing network or other entity. The online job listing network or other entity may require or request that employers provide any number or type of keywords associated with the available job opening. For example, an employer seeking an "iPhone Application Developer" may add the keywords or tags: "apple," "iPhone," "development," etc.

In one embodiment, an online job listing network or other entity may also search the job description for keywords to be associated with the listing as additional tags. For example, the job listing network or other entity may crawl the description, index each word of the description, remove non-descriptive words, and associate the remaining words with the listing. Any suitable techniques may be used to extract only useful descriptive words from the description of the job, so those words can be used to further tag the job listing. In addition, in some embodiments, the online job listing network may search the resumes of individuals who are successfully applying to each listing, and associate descriptive words from those resumes with the job listing. For example, the online job listing network may solicit feedback, ratings, etc. from employers to determine which job seekers have suitable resumes, and search only those suitable resumes for relevant keywords. The online job listing network or other entity may also obtain tag data from topic clustering engines, and/or similar listings in similar categories, and associate tags from those listings with the subject job listing. Thus, the online job listing network or other entity may ultimately associate with each job listing a plurality of keyword tags obtained from varied sources and analyses.

FIG. 3 is a screenshot of an exemplary job board, or listing of electronic job listings, displayed on a web page of the Internet. The job board may be generated based on a plurality of inputs generated by a job seeker. For example, the job board may include search results populated based on the job seeker's indicated search criteria for a job. The job board may list job listings in an order based on the date posted, the job title, the company name, the location, and/or any relevancy ranking. Thus, a job board may provide a listing of available jobs to a particular person, based on that person's current, self-reported interest in being presented with search results of job listings. As described above, it may be desirable to distribute job listings outside of job boards.

Figure 4:
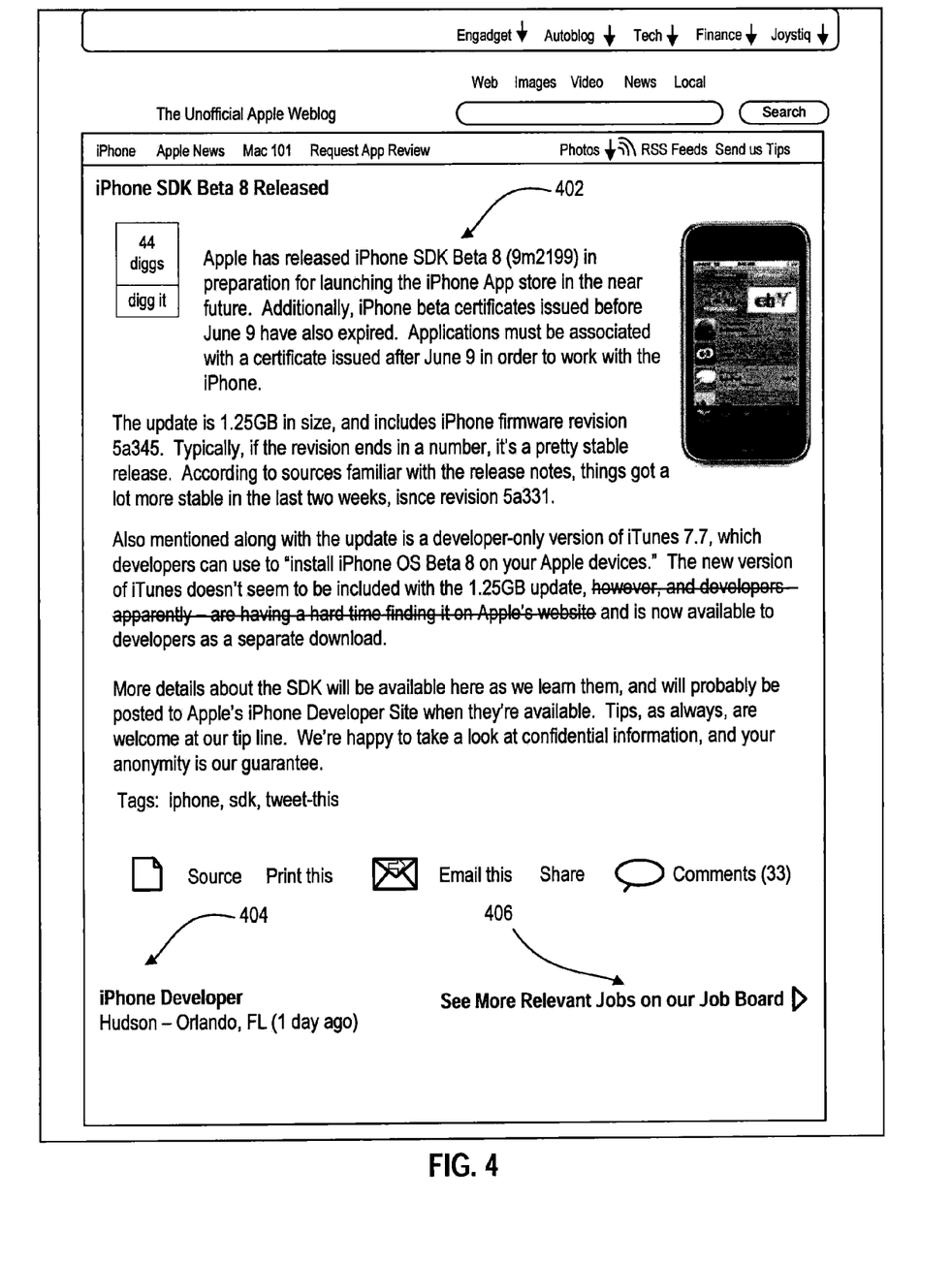
FIG. 4 is a screenshot of an exemplary content web page including an injected job listing, consistent with embodiments of the present disclosure.

FIG. 4 is a screenshot of an exemplary content web page including an injected job listing, consistent with embodiments of the present disclosure. The exemplary embodiment of FIG. 4 may be implemented to provide an alternative method of displaying a job listing to a user through a content site, instead of merely displaying job listings on a job board, such as that depicted in FIG. 3. Consistent with the present disclosure, the job listing may be displayed on any suitable type of content site, such as a news site, product review site, e-commerce site, company/organization site, opinion site, social networking site, or a user generated content (UGC) site, such as a weblog or "blog." In one embodiment, the job listing may be related in topic, subject matter, scope, etc. to the substance of the web page on which it is injected.

FIG. 4 depicts an exemplary blog entry 402, entitled "iPhone SDK Beta 8 Released." Of course, the content site or blog entry may be related to any other type of topic or product. FIG. 4 also depicts a job listing 404, which may be injected into a blog entry. One or more job listings may be injected by embedding an image and/or text into content of the blog listing or other web page. The injected job listing(s) may appear in a window or graphical image and/or accessed through a hyperlink. The injected job listing(s) may appear in any desired location of a web page, as selected by a web page operator, job listing network, and/or employer. Alternatively to display on a web page, the injected job listing(s) may simply be displayed on a screen of an electronic device, either on top of, or immediately after, the display of some type of content. In certain embodiments, an html file may be generated and stored that includes both the content of the web page and the injected job listing(s). Such an html file may be sent from a web server to a user's browser to cause the display of the web page to the user.

A job listing may be injected into a content web page in several different ways, consistent with the present disclosure. In one embodiment, a job listing may be injected into a content web page in advance, by associating a particular set of images, words, and/or other html data with the web page html, such that the job listing is displayed as part of the web page each time it is requested and displayed to a user. In this embodiment, the job listing may be displayed primarily as a function of the web page content, such that the job listing is displayed to every user who requests the web page. Alternatively, job listings may be injected into content web pages in real-time or "on-the-fly." That is, job listings may be selected and injected as content web pages are requested and displayed to users. In this embodiment, job listings may also be selected and displayed as a function of, not only the web page content, but also characteristics associating with a user's visit to the web page, such as the time, date, user ID, user profile, or other "state information" associated with the visit.

By way of example, FIG. 4 depicts a job listing 404 for an "iPhone Developer" in "Hudson-Orland, FL." Job listing 404 may include a drop-down menu and/or one or more hyperlinks configured to display additional information about the job opening and/or additional related job listings. FIG. 4 also depicts a link 406 that is configured to direct a viewer of blog entry 402 to "See More Relevant Jobs on our Job Board." Thus, a viewer of blog entry 402 may elect to view the injected job listing 404 and/or additional job listings besides the related, injected job listing 404.

Job seekers or users in general may interact with job listing 404 in several different ways. In one embodiment, job listing 404 may include user elements that allow a user to be redirected to another website dedicated to the job listing (e.g., similar in nature to the job listing shown in FIG. 2). However, job listing 404 may also or alternatively include buttons or other user elements that allow a user to view or receive additional job information without being redirected to another website. In one embodiment, job listing 404 may reveal additional information about a job when a user clicks on or "mouses over" the job listing. For example, a larger window may slide down or pop-up to display location, salary, requirements, etc., associated with the displayed job listing.

In one embodiment, a user may make a request for more detailed job information to be e-mailed to the user. The user may enter an email address into the job listing, if the online job listing network does not already have an email address on file matching unique cookie data associated with the user. Sending the user additional information by e-mail provides added benefits to the content site by keeping users on advertising-supported pages, and benefits to users who will have the job information available for review at a later time. E-mails may be generated automatically when requested by the user, and may include links to a dedicated job listing page, career advice page, and/or other personalized job related information. Job listing 404 may also have one or more buttons that allow users to add a displayed job listing to a tagged "favorites" section, where the user can view a plurality of different jobs added to the favorites section during one or more web browsing sessions.

Figure 5A:
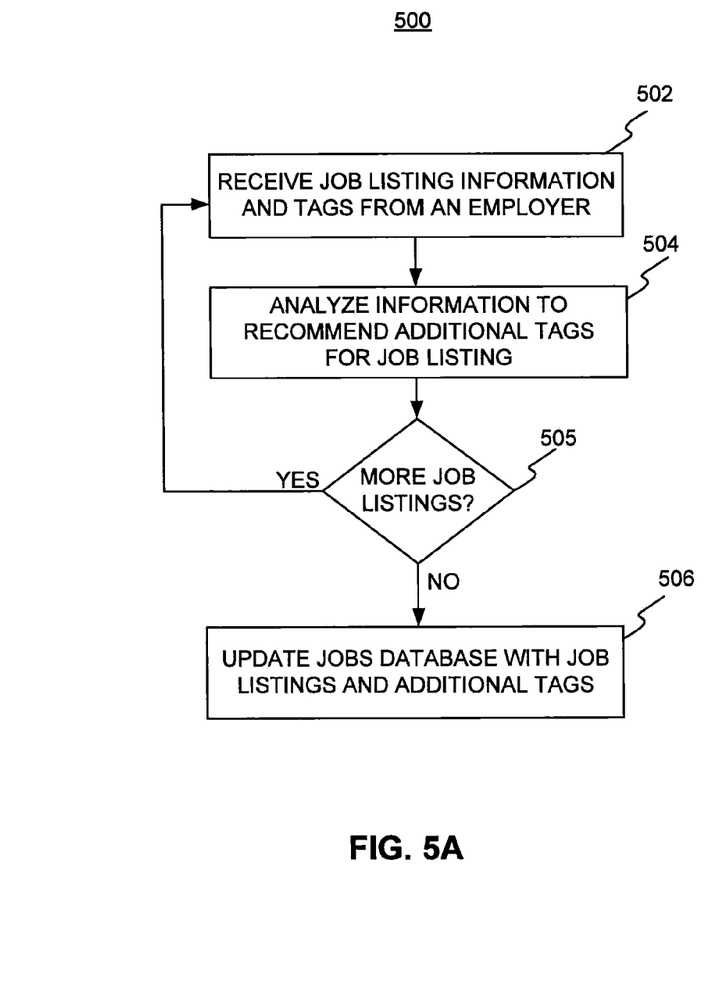
FIGS. 5A and 5B are flowcharts of exemplary methods for electronically distributing job listings over the Internet, in accordance with embodiments of the present disclosure.
Figure 5B:
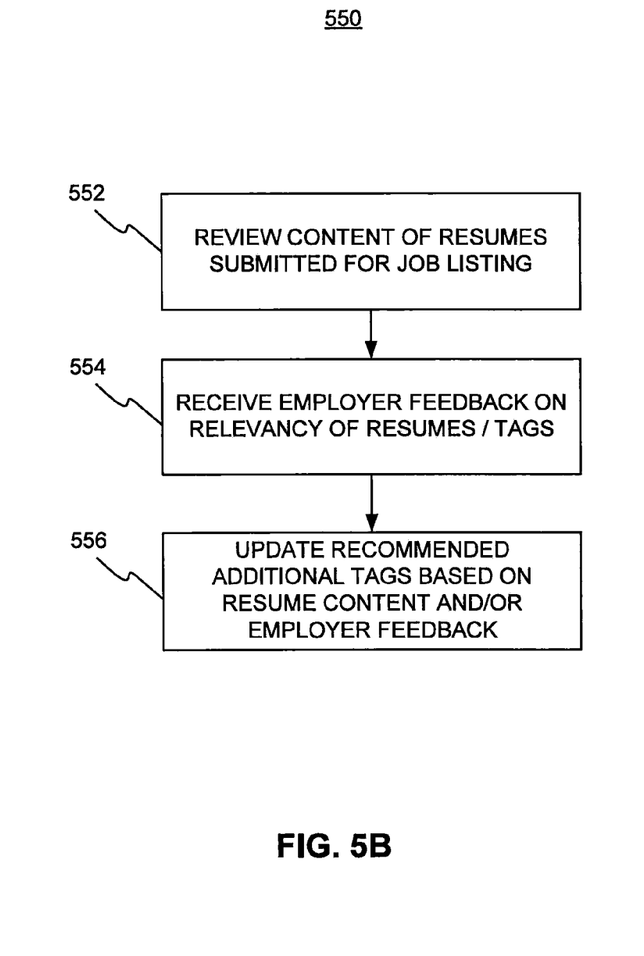

FIGS. 5A and 5B are flowcharts of exemplary methods 500 and 550 for analyzing job listings for distribution over the Internet. As further disclosed herein, the exemplary methods may analyze job listings for distribution by associating keyword tags with job listings. In general, methods 500 and 550 may be performed by processor 106 and/or analytical engine 108, based on instructions and data stored in memory 104 and/or database 110.

In one embodiment, method 500 may include receiving job listing information and tags from an employer (step 502). For example, an employer may provide a job title, job description, category information, contact info, etc. for each job listing. The employer may also provide one or more keywords or "tags" that relate to the job listing. For example, for an "iPhone Developer" position, the employer may list the tags: "apple," "iPhone," and "development" Method 500 may also include analyzing a variety of data to recommend additional tags and/or modify the tags related to the job listing (step 504). For example, an online job listing network may search various fields of the job listing to obtain additional keywords or "tags." The online job listing network or other entity may index the words in the job listing, remove non-descriptive words, and then associate the remaining words as tags of the job listing. As described above, any suitable techniques may be used to extract only useful descriptive words from the description of the job, so those words can be used to further tag the job listing.

Method 500 may involve performing these techniques for as many job listings as the online job listings network receives from employers (step 505). Method 500 may then include updating database 110 with job listings and additional tags, whether received from one or more employers, or recommended for addition or modification (step 506).

In addition, as shown in FIG. 5B, the online job listings network may implement a method 550 for associating additional descriptive words based on submitted resumes and/or employer feedback. For example, the online job listings network may review the content of resumes submitted for the job listing (step 552). Specifically, the online job listings network or other entity may determine which resumes receive positive feedback from the employer associated with the job listing, and extract relevant keywords from those "successful resumes." For instance, if successful resumes contain at least a threshold number of the words, "iphone," "development," "cocoa," "xcode," "sql server 2000," then those tags may be associated with the job listing.

The online job listings network may also solicit feedback, ratings, etc. from employers regarding the relevancy of resumes and/or tags to particular job listings (step 554), e.g., including obtaining employer feedback on undesired, "negative keywords," or "irrelevant tags". For instance, if an employer is not interested in "sql server 2000" despite the prevalence of that tag within successful resumes, the employer may instruct the online job listings network to disassociate that tag from the job listing. Method 550 may including updating recommended additional tags based on resume content and/or employer feedback (step 556).

Thus, the online job listings network may selectively determine which job seekers have suitable resumes, and search only those suitable resumes for relevant keywords. The online job listings network or other entity may also obtain tag data from topic clustering engines, and/or similar listings in similar categories, and associate tags from those listings with the subject job listing. Thus, the online job listings network or other entity may use methods 500 and 550 to ultimately associate with each job listing a plurality of keyword tags obtained from varied sources and analyses, in a periodic or asynchronous manner.

Figure 6:
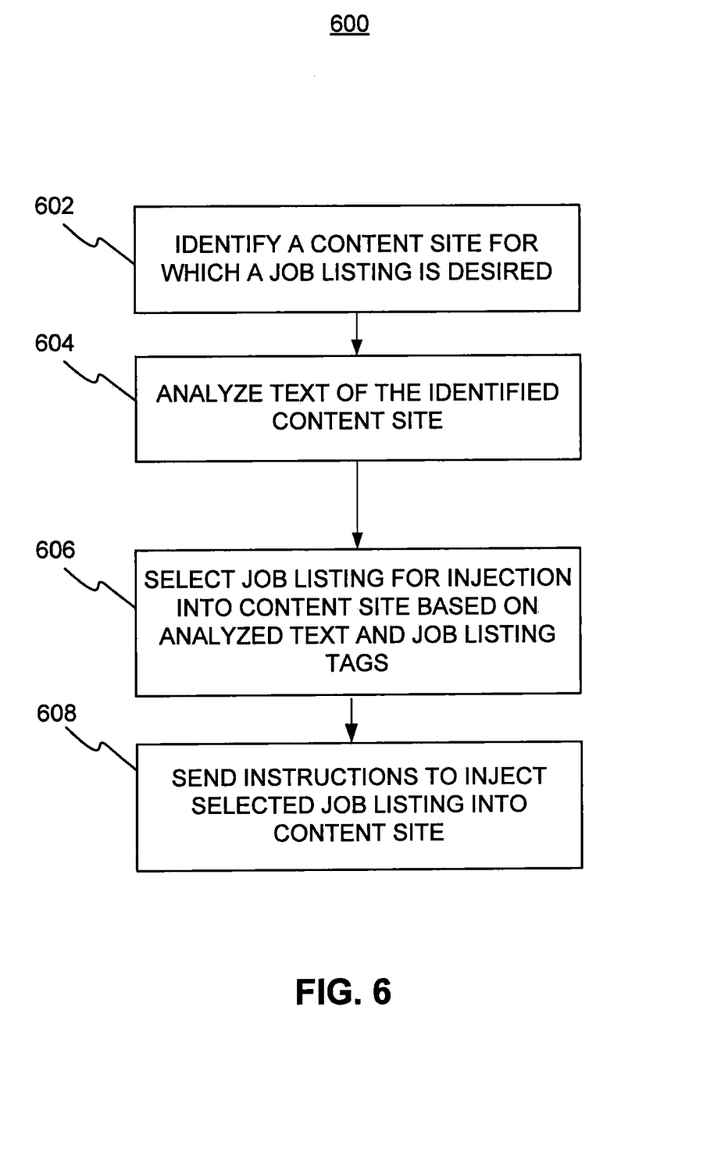
FIG. 6 is a flowchart of another exemplary method for electronically distributing job listings over the Internet, in accordance with embodiments of the present disclosure.

FIG. 6 depicts a flowchart of an exemplary method 600 for injecting job listings into relevant content sites, such as those hosted on in-network web servers 112 and/or out-of-network web servers 113. Generally, method 600 may involve injecting job listings into relevant content sites based on at least the subject matter of the site, and tags associated with the job listing. In one embodiment, method 600 may include identifying a content site for which an injected job listing is desired (step 602). Method 600 may then include analyzing the text of the identified content site (step 604). For example, the online job listings network or other entity may index the words in the content site, remove non-descriptive words, and then associate the remaining words with a profile of the content site. Method 600 may then include selecting a job listing for injection into the content site based on a comparison between the analyzed content site text and the job listing tags generated using, for example, methods 500 and 550 (step 606).

For example, step 606 may implement a suitable algorithm that incorporates a plurality of job listing inputs and content site inputs, to determine which content sites each job listing should be injected into, based generally on a relevancy analysis between the listed job and the content of the site. In one embodiment, the algorithm may be stored in memory 104 and executed by processor 106 and/or analytical engine 108. Job listing inputs may include any job information, desired applicant information, and/or resume information provided by the employer. Job listing inputs may also include information aggregated by, for example, the online job listings network. Content site inputs may include further data from the blog itself, e.g., the author of the post, the category of the post, the tags of the post, the content of the post, the amount of comments on the post, the traffic on the post, etc. The algorithm may be implemented by analytical engine 108, which may be configured to determine placement of job listings on blog sites and content sites based on any combination of characteristics of each job listing and any combination of characteristics of the particular web site.

Method 600 may also include analyzing the aggregated data from the job listing, the content site, and the substance of resumes submitted for the job listing in order to further modify a relevance factor and improve the targeted distribution of job listings to appropriate content sites. Upon selection of a relevant job listing for the content site, method 600 may include sending instructions to inject the selected job listing into the content site (step 608). Injection may include injecting a link, tag, or redirection into the html of the content site. Alternatively, or additionally, injection may include inserting a photo and/or text into html of the content site.

Figure 7:
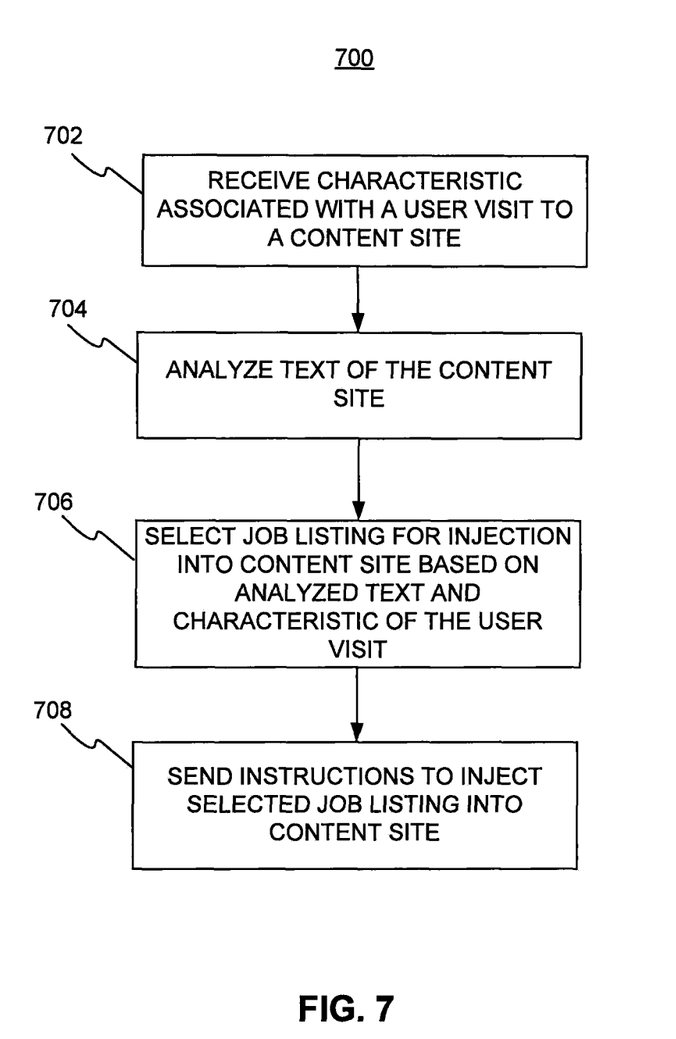
FIG. 7 is a flowchart of another exemplary method for electronically distributing job listings over the Internet, in accordance with embodiments of the present disclosure.

FIG. 7 depicts a flowchart of an exemplary method 700 for injecting job listings upon a user visit to a content site. In one embodiment, method 700 may include receiving a characteristic associated with a user visit to a content site (step 702). The characteristic of the user visit may include a time, a day, a URL, a domain name, a unique user ID, a datapoint associated with a unique user ID, a user demographic, a user location, etc. One or more of the characteristics may be communicated using a state mechanism, such as web cookies.

Method 700 may then include analyzing the text of the visited content site (step 704). For example, the job listing network or other entity may index the words in the content site, remove non-descriptive words, and then associate the remaining words with a profile of the content site. In one embodiment, the content site may be pre-indexed or pre-profiled. Method 600 may then include selecting one or more job listing(s) for injection into the content site based on a comparison between the analyzed content site text and the characteristic of the user visit (step 706). Thereafter, method 600 may include sending instructions to inject the selected job listing into the content site (step 708). As will be appreciated from the present disclosure, the methods and injection techniques described with respect to method 600 may also be applicable to method 700.

Accordingly, job listings may be injected into content sites, not only based on text of the content sites, but also or alternatively based on an identify of a user visiting the content site and/or information known about the user or the user's visit. Specifically, the online job listing network may receive a content site request for a job listing, including a unique ID of the visiting user and select one or more job listing(s) for injection into the content site based on the unique ID of the visiting user. Unique IDs may be tracked and data may be collected based on cookie data. In certain embodiments, analytical engine 108 may incorporate techniques that are similar to those employed in online ad delivery, for determining which content sites the job listings should be displayed upon, where the distribution and placement of each job listing is treated similar to an advertising creative.

Thus, in one embodiment, systems and methods may be implemented that receive as inputs the characteristics unique to each impression of a content site with a particular user. As a result, the systems and methods may receive inputs including auxiliary data associated with a resume and a user behavior, including a resume "look and feel," resume file type, the time of day, the user's network/OS/browser, the user's language, the user's location, the user's level and type of education/work experience/certifications/community involvement, the user's demographic data, etc.

Personalizing the display of job listings based on the identity of the user and/or known information about the user may increase the likelihood of a successful match between the user's skills, availability, location, etc. and the displayed job listing. As a result, employers and/or advertisers may be willing to pay more money for the display of job listings and ads to those known users. In addition, job seekers and employers may benefit from better compatibility and reduced time spent searching for employment opportunities.

It will be appreciated that any suitable configuration of processors and data storage devices may be selected to carry out the embodiments of distribution system 102. The hardware associated with distribution system 102 may be selected to enable quick response to various business needs, relatively fast prototyping, and delivery of high-quality solutions and results. An emphasis may be placed on achieving high performance through scaling on a distributed architecture. The selected hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

Although embodiments of the present disclosure are described herein in relation to job listings, embodiments consistent with the present disclosure may be implemented for a wide variety of other types of listings, such as classified ads, listings property or other items for sale, in search of listings, etc. Thus, the disclosed techniques applied to the categorization, tagging, and selection of job listings for injection into content web pages, may also be applied to the categorization, tagging, and selection of other listings (e.g., classified ads), by analyzing any textual content associated with the listings and, optionally, any other characteristics associated with a web page or a user's visit to the web page.

Embodiments of the invention may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

The many features and advantages of the present disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method for electronically distributing job listings on the Internet, the method comprising:
   identifying a pre-existing content web page for injecting at least one job listing;
   analyzing, by at least one processor, text of the identified pre-existing content web page, the analyzing comprising:
      parsing the text of the pre-existing content web page, and
      creating an index of keywords of the pre-existing content web page; and
   selecting, by the at least one processor, a job listing for injection into the pre-existing content web page, the selecting comprising:
      comparing the keywords of the pre-existing content web page to one or more keyword tags associated with the at least one job listing, the one or more keyword tags including a recommended keyword tag based on at least one of resume content that receives positive feedback from an employer associated with the at least one job listing, or employer feedback,
      calculating, based on a number of matches between the keywords of the content web page and the keyword tags of the at least one job listing, a relevancy factor between subject matter of the pre-existing content web page and the at least one job listing,
      determining, when the relevancy factor is higher than a predetermined threshold, that the at least one job listing is suitable for injection into the pre-existing content web page, and
      injecting the at least one job listing into the pre-existing content web page based on a result of the determination.

2. The method of claim 1, further comprising selecting a job listing for injection into the content web page, based on user profile information of a user requesting the content web page.

3. The method of claim 2, wherein the user profile information includes one or more of a network, OS, a browser of the user, a language of the user, an education level of the user, a work experience of the user, and a demographic characteristic of the user.

4. The method of claim 1, further comprising selecting a job listing for injection into the content web page based on one or more characteristics of the content web page, including one or more of a domain name, a subject matter topic, a keyword tag, an author, content, a number of comments, and an amount of traffic.

5. The method of claim 1, further comprising:
   receiving resume information of users applying for the at least one job listing;
   generating resume keyword tags based on the resume information;
   associating the resume keyword tags with the at least one job listing; and
   injecting the at least one job listing into additional content web pages, based on the resume keyword tags and one or more characteristics of the additional content web pages.

6. The method of claim 1, further comprising:
   receiving, from a viewer of the content web page, a request for additional information about the at least one job listing; and
   sending an email including the additional information to the viewer.

7. The method of claim 1, further comprising expanding a display area of the job listing upon a viewer of the content web page manipulating the job listing.

8. A system for electronically distributing job listings on the Internet, the system comprising:
   a memory device storing instructions for using a processor to electronically distribute job listings over the Internet; and
   at least one processor configured for:
      identifying a pre-existing content web page for which an injected job listing is desired;
      analyzing text of the identified pre-existing content web page, the analyzing comprising:
         parsing the text of the pre-existing content web page, and
         creating an index of keywords of the pre-existing content web page; and
      selecting a job listing for injection into the pre-existing content web page, the selecting comprising:
         comparing the keywords of the pre-existing content web page to one or more keyword tags associated with the at least one job listing, the one or more keyword tags including a recommended keyword tag based on at least one of resume content that receives positive feedback from an employer associated with the at least one job listing, or employer feedback,
         calculating, based on a number of matches between the keywords of the content web page and the keyword tags of the at least one job listing, a relevancy factor between subject matter of the pre-existing content web page and the at least one job listing,
         determining, when the relevancy factor is higher than a predetermined threshold, that the at least one job listing is suitable for injection into the pre-existing content web page, and
         injecting the at least one job listing into the pre-existing content web page based on a result of the determination.

9. The system of claim 8, wherein the processor is further configured for selecting a job listing for injection into the content web page, based on user profile information of a user requesting the content web page.

10. The system of claim 9, wherein the user profile information includes one or more of a network, OS, a browser of the user, a language of the user, an education level of the user, a work experience of the user, and a demographic characteristic of the user.

11. The system of claim 8, wherein the processor is further configured for selecting a job listing for injection into the content web page, based on one or more characteristics of the content web page, including one or more of a domain name, a subject matter topic, a keyword tag, an author, content, a number of comments, and an amount of traffic.

12. The system of claim 8, wherein the processor is further configured for:
   receiving resume information of users applying for a job listing;
   generating resume keyword tags based on the resume information;
   associating the resume keyword tags with the job listing; and
   injecting the job listing into HTML data of additional content web pages, based on the resume keyword tags and one or more characteristics of the additional content web pages.

13. The system of claim 8, further comprising:
   receiving, from a viewer of the content web page, a request for additional information about the job listing to be emailed to the viewer; and
   sending an email including the additional information to the viewer.

14. The system of claim 8, further comprising expanding a display area of the job listing upon a viewer of the content web page manipulating the job listing.

15. A method for electronically distributing job listings on the Internet, the method comprising:
   receiving resume information of users applying for job listings;
   identifying resume keyword tags based on the resume information;
   receiving a characteristic associated with a user visit to a content web page;
   analyzing, by at least one processor, text of the content web page, the analyzing comprising:
      parsing the text of the pre-existing content web page, and
      creating an index of keywords of the pre-existing content web page; and
   selecting, by the at least one processor, a job listing for injection into the content web page, the selecting comprising:
      comparing the keywords of the pre-existing content web page to one or more keyword tags associated with the at least one job listing, the resume keyword tags, and the characteristic of the user visit, the one or more keyword tags including a recommended keyword tag based on at least one of resume content that receives positive feedback from an employer associated with the at least one job listing, or employer feedback,
      calculating, based on a number of matches between the keywords of the content web page and the keyword tags of the at least one job listing, a relevancy factor between subject matter of the pre-existing content web page and the at least one job listing,
      determining, when the relevancy factor is higher than a predetermined threshold, that the at least one job listing is suitable for injection into the pre-existing content web page, and
      injecting the at least one job listing into the pre-existing content web page based on the determination.

16. The method of claim 15, further comprising injecting a job listing into the content web page, based on user profile information of a user requesting the content web page.

17. The method of claim 16, wherein the user profile information includes one or more of a network, OS, a browser of the user, a language of the user, an education level of the user, a work experience of the user, and a demographic characteristic of the user.

18. The method of claim 15, further comprising injecting a job listing into the content web page based on one or more characteristics of the content web page, including one or more of a domain name, a subject matter topic, a keyword tag, an author, content, a number of comments, and an amount of traffic.

19. The method of claim 15, further comprising:
   receiving, from a viewer of the content web page, a request for additional information about the job listing to be emailed to the viewer; and
   sending an email including the additional information to the viewer.

20. The method of claim 15, further comprising expanding a display area of the job listing upon a viewer of the content web page manipulating the job listing.

* * * * *